J. CUFF.

Land Markers.

No. 135,695. Patented Feb. 11, 1873.

UNITED STATES PATENT OFFICE.

JOHN CUFF, OF EMERY, OHIO.

IMPROVEMENT IN LAND-MARKERS.

Specification forming part of Letters Patent No. 135,695, dated February 11, 1873.

*To all whom it may concern:*

Figure 1:
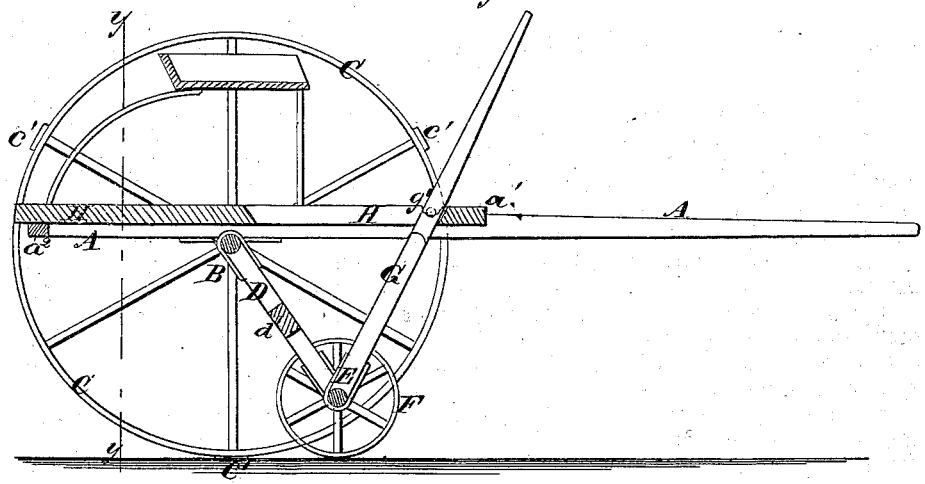
Figure 2:
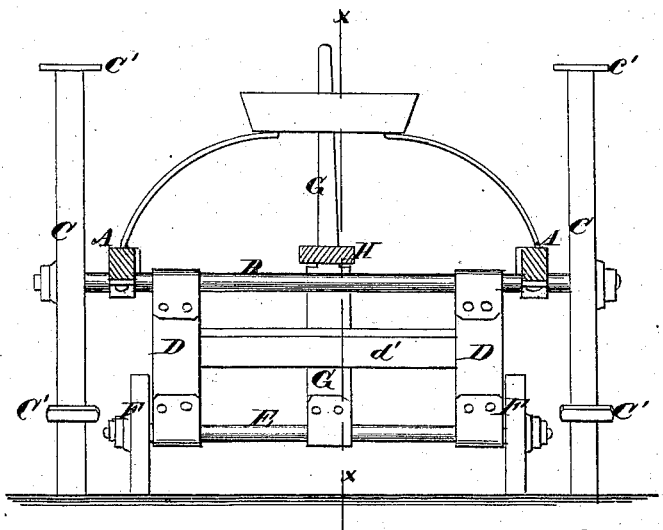

Be it known that I, JOHN CUFF, of Emery, in the county of Fulton and State of Ohio, have invented a new and useful Improvement in Corn-Marker, of which the following is a specification:

Figure 1 is a vertical longitudinal section of my improved machine taken through the line $x\ x$, Fig. 2. Fig. 2 is a cross-section of the same taken through the line $y\ y$, Fig. 1.

Similar letters of reference indicate corresponding parts.

My invention has for its object to furnish an improved machine for marking the ground in cross-row for planting corn, by crossing the field in only one direction, and which shall be simple in construction, convenient in use, and effectual in operation; and it consists in the combination of the axle-wheels, and lever, and the slotted bar with the main axle, marking-wheels provided with cross-blocks upon their rims, and the shafts or frame, as hereinafter more fully described.

A are the shafts, which are connected by a cross-bar, $a^1$, to which the draft is applied, and at their rear ends by a cross bar or bow, $a^2$. B is the axle, which revolves in bearings attached to the rear part of the shafts A, and to its ends are attached the large drive or marking wheels C. The axle B is made of such a length that the wheels C may be at the distance apart required for the rows, so that the tracks of the wheels may mark the places for the rows in one direction. The wheels C are rigidly attached to the axle B, so that they will revolve exactly together, and to their rims are attached cross bars or blocks $c'$, at a distance apart equal to the desired distance apart of the hills of corn. The cross-blocks $c'$ upon the two wheels are exactly in line with each other, so that the corresponding blocks of the two wheels may strike the ground at the same time, and thus mark the cross-rows. D are two arms connected by a cross-bar, $d'$. The upper ends of the arms D are hung upon the axle B, and to their lower ends is attached the axle E, upon the journals of which revolve the small wheels F. The arms D are made of such a length that when swung down into, or nearly into, a vertical position the wheels C will be raised from the ground, so that the machine can be conveniently turned or moved from place to place. To the middle part of the axle E is pivoted the lower end of the lever G, which passes up through a slot in the bar H, the forward end of which is attached to the cross-bar $a^1$ and its rear end to the cross bar or bow $a^2$. $g'$ is a pin which passes through the lever G and rests upon the bar H, to prevent the said lever from dropping through the slot in the said bar.

By this construction, by moving the lever G forward the wheels C will be allowed to come in contact with the ground, and by moving the said lever rearward the wheels C will be raised from the ground.

I am aware that stalk-choppers have been made in which the shaft of cutter-wheel was pivoted at each end in a lever-frame, the said frame having wheels at the front and arms in the rear, by which a person on the ground could raise the choppers. I therefore desire to disclaim this idea, broadly.

What, however, I do esteem to be new, and desire to protect by Letters Patent, is—

The arms D D, pivoted at one end to the axle B of marking-wheels, and at the other to an axle, E, provided with small wheels F F and lever G, arranged as described.

JOHN CUFF.

Witnesses:
W. C. KELLEY,
A. B. CLARK.